United States Patent [19]
Tatman et al.

[11] Patent Number: 5,281,075
[45] Date of Patent: Jan. 25, 1994

[54] APPARATUS FOR TRANSPORTING RECREATIONAL TYPE VEHICLES

[76] Inventors: Darrell J. Tatman; Albert D. Tatman, both of 3945 W. Hearn, Phoenix, Ariz. 85023

[21] Appl. No.: 792,664

[22] Filed: Nov. 15, 1991

[51] Int. Cl.$^5$ ............................................. B60P 3/06
[52] U.S. Cl. .................................. 414/538; 414/480; 414/537
[58] Field of Search ................ 414/462, 480, 538, 537

[56] References Cited

U.S. PATENT DOCUMENTS

| | | | |
|---|---|---|---|
| 3,726,423 | 4/1973 | Miron | 414/480 |
| 3,871,540 | 3/1975 | Jenkins | 414/538 X |
| 3,872,989 | 3/1975 | Smithson et al. | 414/462 |
| 3,972,433 | 8/1976 | Reed | 414/462 |

FOREIGN PATENT DOCUMENTS

284631 1/1971 U.S.S.R. ............................. 414/480

*Primary Examiner*—David A. Bucci
*Assistant Examiner*—Janice Krizek

[57] ABSTRACT

Apparatus for loading and transporting recreational vehicles includes a pickup truck. Four upright supports are coupled to the pickup's bed. An upper rack is coupled to the four upright supports, generally parallel to the bed with space between the rack and the bed to support a first recreational vehicle on the bed beneath the rack. A vehicle transport ramp is pivotally coupled to the upper rack pivotal from a first position in which a second recreational vehicle may drive onto the ramp to a second position, generally horizontal and parallel to the bed, for transporting the second vehicle on the ramp. The ramp has a displaceable extension for shortening the ramp's length when the ramp is pivoted to the second position. The displaceable extension is used for extending the length of the ramp to contact the ground when the ramp is in the first position. It also permits (1) extending the length of the ramp to couple with the first, removable extension when the ramp is in the first position and (2) shortening the length of the ramp when the ramp is in the second position. A winch is coupled to the rack for coupling to and assisting a second recreational vehicle to move up upon the ramp.

9 Claims, 1 Drawing Sheet

5,281,075

APPARATUS FOR TRANSPORTING RECREATIONAL TYPE VEHICLES

FIELD OF INVENTION

This invention relates to an apparatus for transporting recreational type vehicles. With this apparatus, two vehicles such as Quad runners, snowmobiles, or jet skis can be transported one above the other in most foreign or domestic pick-up trucks.

BACKGROUND OF THE INVENTION

The need to provide a method of transporting recreational type vehicles such as Quad runners, snowmobiles, or jet skis easily and safely has been a problem. Different methods have been tried such as trailers or merely trying to stack them in the back of a pick-up truck. Using our apparatus, these vehicles can be transported easier and safer. It is to these ends that our invention is directed.

OBJECTS OF THE INVENTION

It is, therefore, a broad object of our invention to provide such an on demand apparatus made to fit most domestic and foreign pick-up trucks.

It is another object of our invention to provide such an apparatus that is simple and economical to manufacture.

In another aspect, a third object of our invention is to provide such an apparatus for transporting recreational type vehicles that is readily assembled and disassembled.

SUMMARY OF THE INVENTION

Briefly, these and other objects of our invention are achieved by an apparatus for transporting recreational type vehicles including loading ramps, a winch for loading top vehicle, a strategically placed pivot bar on upper part of apparatus allowing top vehicle to tilt to three separate positions. This tilting of the upper ramp makes it possible to easily load bottom vehicle to its traveling position. Vehicles are than anchored by the use of elastic straps for safe traveling.

The above listed components, when assembled can be readily affixed to bed of a pick-up truck by bolting four base plates connected to uprights to the bed of the pick-up. These uprights support the upper apparatus and vehicle. When apparatus is installed in this manner, two recreational type vehicles such as Quad runners, snowmobiles, or jet skis can be transported easily and safely.

The invention may be further summarized as apparatus of size and configuration for loading and transporting recreational type vehicles. It includes a pickup truck having a pickup bed. The bed has a front end and a rear end, a left side and a right side. Four upright supports are coupled to the pickup bed, two at the front end of the bed, one on each side, and two at the rear end of the bed, one on each side. There is an upper rack coupled to the four upright supports, generally parallel to the bed with space between the rack and the bed to support a first recreational vehicle on the bed beneath the rack.

Included is a vehicle transport ramp, pivotally coupled to the upper rack and pivotal from a first position in which a second recreational vehicle may drive onto the ramp to a second position, generally horizontal and parallel to the bed, for transporting the second vehicle on the ramp.

The ramp further comprises a displaceable extension for shortening the length of the ramp when pivoted to the second position. The displaceable extension includes a first, removable extension for extending the length of the ramp to contact the ground when the ramp is in the first position. In turn, the displaceable extension includes a second, slide coupled extension for extending the length of the ramp to couple with the first, removable extension when the ramp is in the first position and for shortening the length of the ramp when the ramp is in the second position. In practice, the removable extension is coupled to the pickup truck for loading a first recreational vehicle into the pickup bed.

For convenience, the ramp is pivotal to a third position tilting downward toward the front end of the pickup bed to provide greater headroom when loading a first vehicle onto the bed.

Further included are raised side rails on the pickup bed and means coupling each of the upright supports to the side rails. There is also a winch coupled to the rack for coupling to and assisting a second recreational vehicle to move up upon the ramp. Finally, the invention includes a first and a second recreational vehicle. The first recreational vehicle is positioned for transport on the pickup bed, the ramp being in its second position. The second recreational vehicle is positioned for transport on the ramp.

DISCRIPTION OF DRAWINGS

The subject matter of the invention is particularly pointed out and distinctly claimed in the concluding portion of the specification. The invention, however, both as to organization and method of operation, may best be understood by reference to the following discription taken in conjunction with the subjoined claims and the accompanying drawings of which:

DETAILED DESCRIPTION OF THE INVENTION

Figure 1:
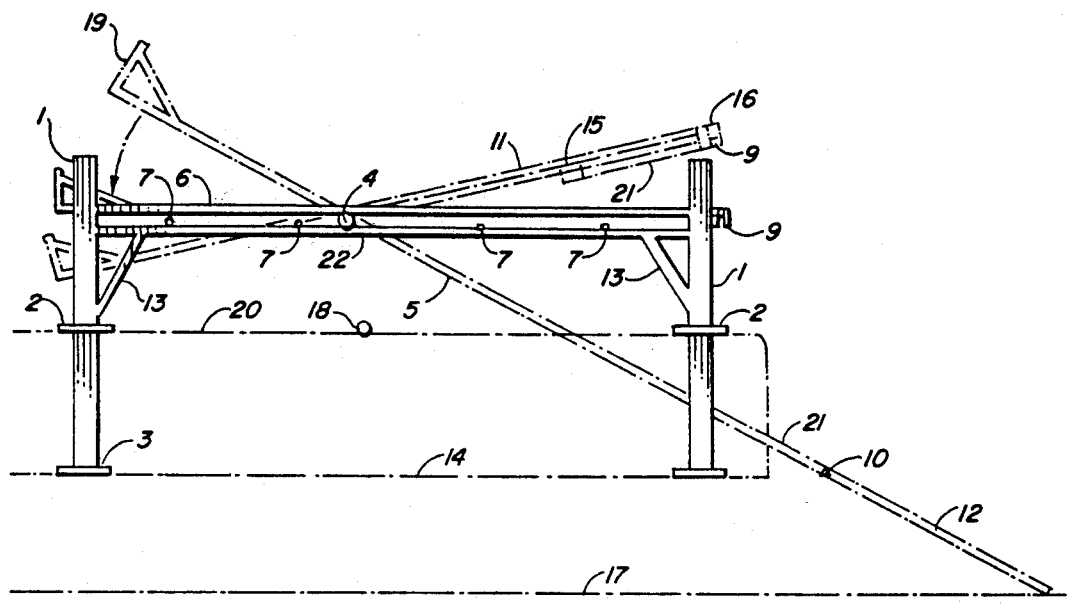
FIG. 1 is a pictorial representation of apparatus assembled but not affixed to truck.

Referring now to FIG. 1, four uprights 1, are connected to base plates 3. Base plates 3 are then bolted to pick-up bed 14 at four corners of bed 14 using four $\frac{3}{8}'' \times 1\frac{1}{2}''$ carriage bolts (not shown). Uprights 1 are then secured to siderail 20 of pick-up bed 14 by metal connectors 2. Ramp 5 is shown as a dotted line in the loading position for loading top Quad runner, snowmobile, or jet ski.

Loading is accomplished by the use of a winch 18. The winch pulls the vehicle up the ramp to its upper position. When the top vehicle 30 (FIG. 2) is at its uppermost position, it will rest against stop 19 (see FIG. 2). Now ramp 5 is tilted, its front end downward, accomplished by use of roller pivot 4 in upper rack 22. Ramp 5 is now in the position shown as dotted line 11. This allows loading of bottom vehicle 40 (FIG. 2).

When bottom vehicle 40 has been loaded, tilt ramp 5 pivots to a horizontal position 6 and is secured at metal rings 7 by means of elastic straps (not shown). Then, as the drawing of FIG. 1 shows, lower extension ramp 12 that was connected with ramp 5 and the ground 17 at point 10 can now be stored in bed of pick-up truck.

As FIG. 1 also shows the extended end 21 of ramp 5 can now slide forward on flange 15 until it meets metal stop 16. Ramp 5 in the traveling position 6 is secured by automatic lock 9. Extension 21 to ramp 5 is necessary to reduce the angle of ramp 5. Upper rack 22 is strengthened by braces 13.

Figure 2:
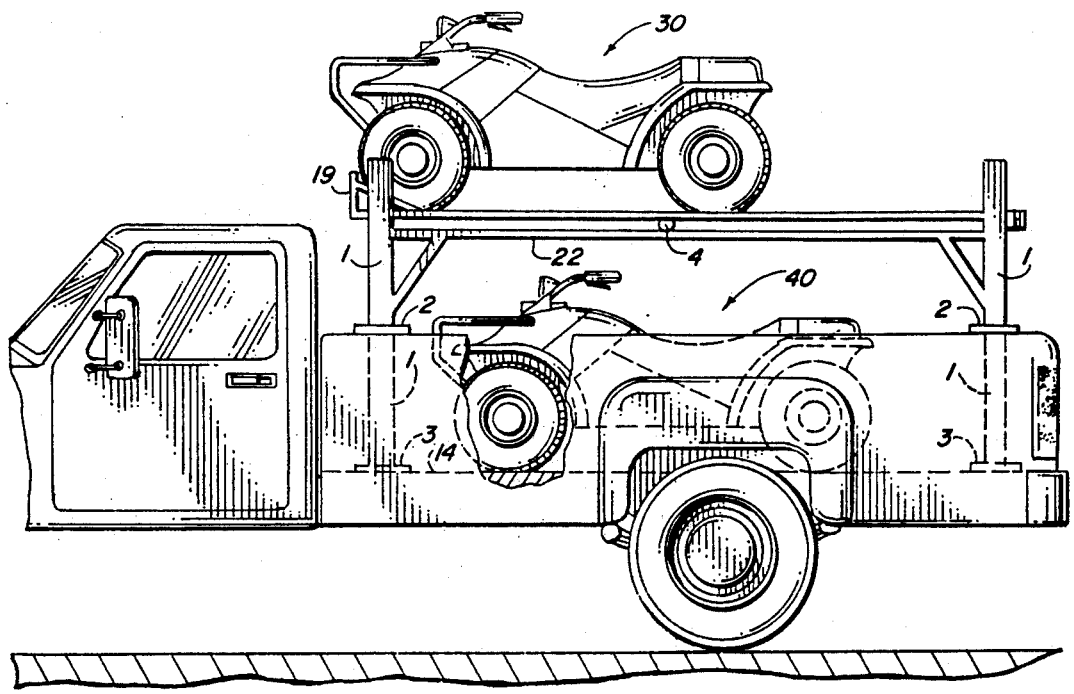
FIG. 2 represents a view of the apparatus affixed to pick-up truck with recreational type vehicles in traveling position.

In FIG. 2, we are merely illustrating the tilt ramp apparatus for transporting recreational vehicles in its final state.

It will be apparent from the foregoing discussion that the subject invention can readily be assembled and subsequently disassembled at will.

We claim:

1. Apparatus of size and configuration for loading and transporting recreational vehicles, said apparatus comprising:

a pickup truck having a pickup bed, said bed having a front end and a rear end, a left side and a right side;

four upright supports coupled to said pickup bed, two at the front end of said bed, one on each side, and two at the rear end of said bed, one on each side;

an upper rack coupled to said four upright supports, generally parallel to said bed with space between said rack and said bed to support a first recreational vehicle on said bed beneath said rack; and a vehicle transport ramp, pivotally coupled to said upper rack and pivotal from a first position in which a second recreational vehicle may drive onto said ramp to a second position, generally horizontal and parallel to said bed, for transporting said second vehicle on said ramp wherein said ramp further comprises a displaceable extension for shortening the length of said ramp when pivoted to said second position;

said displaceable extension includes a first, removable extension for extending the length of said ramp to contact the ground when said ramp is in said first position, and a second, slide coupled extension for extending the length of said ramp to coupled with said first, removable extension when said ramp is in said first position and for shortening the length of said ramp when said ramp is in said second position.

2. The apparatus of claim 1, said removable extension being coupled to said pickup truck for loading said first recreational vehicle into said pickup bed.

3. The apparatus of claim 2, said ramp being pivotal to a third position tilting downward toward the front end of said pickup bed to provide greater headroom when loading said first vehicle onto said bed.

4. The apparatus of claim 1 further including raised side rails on said pickup bed and means coupling each of said upright supports to said side rails.

5. The apparatus of claim 1 further comprising a winch in combination with said rack for coupling to an assisting said second recreational vehicle to move up upon said ramp.

6. The apparatus of claim 4, said removable extension being coupled to said pickup truck for loading said first recreational vehicle onto said pickup bed.

7. The apparatus of claim 6, said ramp being pivotal to a third position tilting downward toward the front end of said pickup bed to provide greater headroom when loading said first vehicle onto said bed.

8. The apparatus of claim 5, said removable extension being coupled to said pickup truck for loading said first recreational vehicle onto said pickup bed.

9. The apparatus of claim 8, said ramp being pivotal to a third position tilting downward toward the front end of said pickup bed to provide greater headroom when loading said first vehicle onto said bed.

* * * * *